United States Patent
Delaite et al.

(10) Patent No.: US 6,933,347 B2
(45) Date of Patent: Aug. 23, 2005

(54) TUBES OBTAINED FROM A PROPYLENE POLYMER COMPOSITION

(75) Inventors: Emmanuel Delaite, Braine-le-Comte (BE); Hervé Cuypers, Ceroux-Mousty (BE)

(73) Assignee: BP Belgium N.V., Antwerp (BE)

( * ) Notice: Subject to any disclaimer, the term of this patent is extended or adjusted under 35 U.S.C. 154(b) by 124 days.

(21) Appl. No.: 10/416,059

(22) PCT Filed: Nov. 8, 2001

(86) PCT No.: PCT/EP01/13134
§ 371 (c)(1),
(2), (4) Date: May 7, 2003

(87) PCT Pub. No.: WO02/38670
PCT Pub. Date: May 16, 2002

(65) Prior Publication Data
US 2004/0039124 A1 Feb. 26, 2004

(30) Foreign Application Priority Data
Nov. 10, 2000 (FR) .............................................. 00 14519

(51) Int. Cl.⁷ ........................... C08L 23/12; C08L 23/14
(52) U.S. Cl. ....................... 525/240; 138/118; 138/177; 138/DIG. 7
(58) Field of Search ........................... 525/240; 138/118, 138/177, DIG. 7

(56) References Cited

U.S. PATENT DOCUMENTS 6,433,087 B1 * 8/2002 Ebner et al. ................ 525/191

FOREIGN PATENT DOCUMENTS

EP 316692 * 5/1989
WO WO99/35430 * 7/1999

* cited by examiner

*Primary Examiner*—Roberto Rabago
(74) *Attorney, Agent, or Firm*—David P. Yusko; James R. Henes

(57) ABSTRACT

Tubes formed from a propylene based composition having a flexural modulus of elasticity of 1,400 to 2,000 MPa and a melt flow index of 0.1 to 1 g/10 minutes, including: from 80 to 97 parts in weight of a propylene homopolymer (A) having an isotacticity index of at least 0.96, and from 20 to 3 parts in weight of a statistical copolymer of propylene (B) containing from 45% to 70% ethylene by mole and/or an alpha olefin containing from 4 to 8 atoms of carbon, the ratio of the intrinsic viscosity of polymer (B) to polymer (A) being at least 1.55 and less than or equal to 3.

10 Claims, No Drawings

TUBES OBTAINED FROM A PROPYLENE POLYMER COMPOSITION

The present invention concerns tubes obtained from a propylene polymer based composition. More specifically, it concerns tubes designed to transport low pressure fluids, such as domestic discharge or drainage tubes, obtained from a composition including a propylene homopolymer and a statistical copolymer of propylene.

We know how to use polypropylene to produce tubes designed to transport waste water. This is how document WO 99/35430 describes the use of a composition containing 80 to 98 parts in weight of a propylene homopolymer having an isotacticity index of at least 95%, from 2 to 20 parts in weight of a propylene copolymer containing from 50 to 70 parts in weight of propylene and 50 to 30 parts in weight of ethylene, for the manufacture of tubes to be used for waste disposal. According to this document, the ratio of the intrinsic viscosity of the copolymer to that of the homopolymer must be between 0.9 and 1.5, and the composition must have a melt flow index between 0.15 and 0.8 g/10 minutes, typically less than or equal to 0.2 g/10 minutes.

However, the compositions thus obtained do not have an optimal resistance to impact. In addition, obtaining melt flow indexes as low as 0.2 g/10 minutes leads to excess production costs which make these compositions economically less profitable.

The purpose of the present invention is to produce tubes obtained from a propylene polymer based composition which does not have these disadvantages.

In order to do this, the present invention involves tubes obtained from a propylene polymer based composition having a module of elasticity at flexion of 1,400 to 2,000 MPa and a melt flow index of 0.1 to 1 g/10 minutes, including:

from 80 to 97 parts in weight of a propylene homopolymer (A) having an isotacticity index of at least 0.96, and from 20 to 3 parts in weight of a statistical copolymer of propylene (B) having from 45% to 70% ethylene mass and/or an alpha olefin containing from 4 to 8 atoms of carbon, the ratio of the intrinsic viscosity of polymer (B) to polymer (A) being at least 1:55.

It goes without saying, in terms of the present invention, that the respective quantities of polymers (A) and (B) used are such that their sum is equal to 100 parts in weight.

The flexion module of the material (Flex Mod) is measured at 23° C. on an injected test piece of a thickness of 4 mm according to ISO standard 178 and expressed in megapascals (MPa). The melt flow index, hereafter referred to simply as MFI, is measured under a load of 2.16 kg at 230° C. according to ASTM standard 1238 (1986) and expressed in g/10 minutes.

The composition that can be used to manufacture tubes according to the present invention has the advantage of a Flex Mod of at least 1,500 MPa. Flex Mods of more than 1,900 MPa give the tubes obtained with these compositions optimal resistance to impact. It is also preferred that the MFI of compositions that can be used according to the invention be at least 0.3 g/10 minutes. MFI's of more than 0.6 are especially preferred.

Compositions whose MFI is 0.3 to 0.6 g/10 minutes have the advantage of having good properties at a lower cost and of being able to be welded to a wider range of tubes.

The quantity of homopolymer (A) contained in the composition that can be used to manufacture tubes according to the invention has the advantage of being at least 85 parts of the weight. Amounts of homopolymer (A) of at most 95 parts in weight give especially good results.

The propylene homopolymer (A) used in the composition that can be used to manufacture tubes according to the invention has an isotacticity index (measured by the molar fraction of the isotactile triads according to the method described in relation to the examples) of at least 0.96, more specifically, at least 0.97. In general, the isotacticity index of the homopolymer (A) does not exceed 0.99.

The quantity of statistical copolymer (B) is most often no more than 15 parts in weight, and quantities of at least 5 parts in weight are especially advantageous. In a preferred way [of manufacturing the invention], the statistical copolymer (B) contains only polymer unities derived from ethylene.

Statistical copolymers containing from 35% to 60% in weight of ethylene are particularly well suited.

The content of comonomers mentioned in the present description is determined by Fourier transform infrared spectrometry on the polymer transformed into a pressed film of 200 $\mu$m. Absorption bands with 732 and 720 cm$^{-1}$ are the ones used to determine the ethylene content. The absorption band with 767 cm$^{-1}$ is used to determine the 1-butene content.

The intrinsic viscosity of the polymers is measured in tetraline at 140° C. as described hereafter in relation to the examples.

One of the essential characteristics of compositions that can be used to manufacture tubes according to the invention is the use of polymers (B) and (A) as defined above and for which the ratio of intrinsic viscosity is at least 1:55. By using such polymers, tubes can be prepared which have the required properties of rigidity and good resistance to impact at the same time. The maximal value of the ratio of the viscosity of polymers (B) and (A) is not critical. However, this ratio is preferably less than or equal to 3, more specifically, less than or equal to 2.5. Values between 1.6 and 2.3 give especially advantageous results.

Within the scope of the present invention, compositions are most often used which have an elasticity module in flexion from 1,500 to 1,900 MPa, a melt flow index of 0.3 to 0.6 g/10 minutes, including:

from 85 to 95 parts in weight of a propylene homopolymer (A) having an isotacticity index of at least 0.96, and from 15 to 5 parts in weight of a statistical copolymer of propylene (B) having from 35% to 55% in weight of ethylene, the ratio of the intrinsic viscosity of polymer (B) to polymer (A) being 1.6 to 2.

In spite of their relatively high melt flow index, such compositions have a rigidity/impact resistance ratio which is especially well adapted to the manufacture of tubes according to the invention.

The homopolymer (A) and the copolymer (B) that make up the composition that can be used for manufacturing tubes according to the invention can be obtained by means of any known sufficiently productive and stereospecific catalytic system, making it possible to polymerize propylene in an isotactile form and to incorporate the required amounts of ethylene and/or alpha olefins. The intrinsic viscosity of these polymers can be adjusted by the addition of one or more molecular mass adjusting agents, such as hydrogen, preferably. The viscosity of these polymers is generally adjusted so as to satisfy the ratio mentioned above, as well as the final fluidity index of the compound.

Compositions that can be used to manufacture tubes according to the present invention and that give the best results are obtained by using polymers (A) and (B), obtained with the use of a catalytic system including one solid containing, by way of essential components, titanium, magnesium, chlorine and an electron donor (internal electron donor), an organoaluminum compound such as trialkylaluminum and, more specifically, one of the alkylalkoxysilanes, preferably such as the diethyl- and dimethoxysilanes including two alkyl or cycloalkyl radicals containing, in alpha position, a secondary or tertiary carbon atom. Compounds of this type which give good results are diisobutyldimethoxysilane and dicyclopentyldimethoxysilane.

Such catalytic systems are well known to professionals in the field. The components of the catalytic systems preferred according to the invention are generally set up so that the molar ratio between the aluminum of the organoaluminum compound and the titanium of the catalytic solid is 3 to 300, more specifically, 10 to 200. In addition, the preferred catalytic systems are such that the molar ratio between the aluminum of the organoaluminum compound and the silicon of the silicon compound is 0.5 to 10, more specifically, 1 to 4.

The composition that can be used to manufacture tubes according to the invention have the advantage of containing at least 50% in weight of polymers (A) and (B), more specifically, at least 90% in weight in relation to the total weight of the composition.

In addition to polymers (A) and (B), the composition that can be used to manufacture tubes according to the invention may contain various additives which are generally not more than 50% in weight, preferably 10% in weight in relation to the total weight of the composition. The composition that can be used according to the invention can, in particular, contain other polymers, load materials, stabilizers, pigments, antacids or nucleation agents. Preferably, the mixture according to the invention contains in the way of polymers only polymers (A) and (B) defined above.

Compositions containing from 0.05% to 1% in weight of a nucleating agent give particularly good results. Among these nucleating agents, sodium benzoate is preferred for reasons of rigidity/cost ratio. It is also observed that the compositions that can be used to manufacture tubes according to the invention that contain 0.01% to 0.5% in weight of an antacid and from 0.1% to 1% in weight of an antioxidant are better. By way of an antioxidant, encumbered phenols, phosphites, organosulfur compounds and/or their mixtures are used most often.

Preferably, the compositions that can be used to manufacture tubes according to the invention do not contain significant amounts of load material. In fact, it is seen that amounts less than or equal to 5% in weight suffice to obtain good properties along with satisfactory economic conditions.

The composition that can be used according to the present invention can be obtained by any appropriate technique. One can, for example, mix the homopolymer (A) and the copolymer (B) and possible additives together according to any known process whatsoever, such as a melt mixture of the two preformed polymers. However, processes during which the polymers (A) and (B) are prepared in two successive stages of polymerization are preferred. The polymer thus obtained is generally called a sequenced propylene copolymer. Generally, the homopolymer (A) is first prepared, and then the copolymer (B) is prepared in the presence of the homopolymer (A) from the first stage. These stages can each be done independently of each other, in a suspension, in an inert hydrocarbon diluent, in propylene maintained in the liquid state or even in the gaseous state, on an agitated bed or, preferably, on a fluid bed.

Polymers (A) and (B) are mixed, preferably, in two successive stages of polymerization, in a gaseous phase in a reactor with a fluid bed using the preferred catalytic system described previously.

In this particular case, possible additives are also most often inserted during a later stage of melt mixing of the additives and polymers.

The composition that can be used to manufacture tubes according to the invention can be made according to any known process for the manufacture of formed objects. It is especially suitable for manufacturing tubes and, more specifically, for the manufacture by extrusion of tubes designed for the transport of low pressure fluid. In addition to improved rigidity, the tubes manufactured using the composition have good impact resistance.

The following examples are intended to illustrate the invention. The techniques for measuring the sizes mentioned in the examples, the units expressing these sizes and the meaning of the symbols used in these examples are explained below.

The viscosity of the polymers is measured in tetraline at 140° C. using an Ostwald viscometer on solutions with 1.5 g/l of polymer.

The fractions of polymer soluble in xylene (XS) are determined by putting 3 g of polymer in a solution in 200 ml of metaxylene at boiling temperature, cooling the solution to 25° C. by immersion in a water bath and filtering the soluble fraction at 25° C. on filter paper corresponding to a normalized G2.

| | |
|---|---|
| MF1 | fluidity index of the composition measured under a load of 2.16 kg at 230° C. according to ASTM standard 1238 (1986) |
| Total C2 | total content in ethylene expressed in % in weight in relation to the weight of polymer (A) and polymer (B), measured on a sample of the sequenced polymer transformed into a pressed film of 200 $\mu$m by infrared spectrometry from bands of 732 and 720 cm$^{-1}$ |
| [A] | amount of polymer (A) present in the composition in relation to the total weight of polymer (A) and polymer (B), expressed in % and estimated from the equation: [A] = 100 − [B] |
| [B] | amount of polymer (A) present in the composition in relation to the total weight of polymer (A) and polymer (B), expressed in % and estimated from soluble fractions of polymers [A] and [B] and their mixture |
| C2 (B) | ethylene content of copolymer (B) expressed in % in weight in relation to the total weight of polymer (B) and determined by applying the following equation: C2(B) = total C2 × 100/(B) |

-continued

| | |
|---|---|
| II | Isotacticity index of polymer (A), characterized by the molar fraction of isotactic triads (sequenced chain of three propylene monomer units in a meso configuration). This value is determined on a sample of polymer (A) by nuclear magnetic resonance in 13C as described in Macromolecules, volume 6, no. 6, p. 925–926 (1973) and in references (3) to (9) of that publication. |
| β/α: | ratio of the intrinsic viscosity of polymer (B) to polymer (A) determined from the equation: $$\frac{\beta}{\alpha} = \left(\frac{\eta}{\alpha} - \left[\frac{A}{100}\right]\right) / \left[\frac{B}{100}\right]$$ in which η represents the viscosity of the mixture of polymers (A) and (B) |
| Flex. Mod.: | Flex-module of the composition measured as previously indicated in the description. |
| Charpy: | Resistance to impact measured according to ISO standard 179/1cA |

EXAMPLES 1 (ACCORDING TO THE INVENTION) AND 2R (GIVEN BY WAY OF COMPARISON)

Sequenced copolymers containing a homopolymer of propylene (polymer (A)) and a statistical copolymer (polymer (B)) were prepared by polymerization in a gaseous phase in a fluid bed in two successive stages, in the presence of a catalyst with a magnesium chloride base containing 2.6% in weight of titanium and 11% in weight of diisobutyl-phthalate (internal electron donor), triethylaluminum and dicyclopentyl-dimethoxysilane in respective quantities, such as the molar ratio Al/Ti=75 and Al/Si=2. A sample of polymer (A) was taken for analysis at the end of the first stage.

The conditions of polymerization, as well as the properties of the sequenced polymers, are given again in Table 1 hereafter.

One hundred parts in weight of these sequenced polymers are then processed in a ZSK 30 extruder (sold by the Werner & Pfeider company) at a temperature of 230° C. together with:

0.2 parts in weight of pentaerythrityl tetrakis (3,5-ditert-butyl-4-hydroxyphenyl propionate) sold under the name IRGANOX® 1010 by the firm CIBA GEIGY,
0.1 parts in weight of tris (2,4-ditert-butylphenyl) phosphite sold under the name IRGAFOS®;
0.2 parts in weight of DSTDP (distearylthiodipropionate) sold under the name HOSTANOX®,
0.05 parts in weight of hydrotalcite DHT-A4, and
0.2 parts in weight of sodium benzoate.

The MFI and the Flex Mod, as well as other properties of compositions thus obtained, are also reviewed in the following Table 1.

It is thus seen that the composition that can be used according to the invention has a slightly better rigidity/impact resistance ratio in spite of a high MFI.

These compositions were then processed for the manufacture of tubes by extrusion of granules by a monoscrew type extruder (Battenfeld type) at 210° C.

TABLE 1

| Characteristics | Example 1 | Example 2R |
|---|---|---|
| Polymerization - polymer (A) | | |
| Pressure (bars) | 32 | 32 |
| Temperature (° C.) | 65 | 65 |
| Staying time (hours) | 2 | 2 |

TABLE 1-continued

| Characteristics | Example 1 | Example 2R |
|---|---|---|
| Molar ratio of H2/propylene in the gas (mol/mol) | 0.0017 | 0.001 |
| Polymerization - polymer (B) | | |
| Pressure (bars) | 20 | 20 |
| Temperature (° C.) | 72 | 72 |
| Staying time (hours) | 1.53 | 1.59 |
| Staying time (hours) | 0.0214 | 0.0189 |
| Molar ratio of H2/propylene in the gas (mol/mol) | 0.79 | 0.82 |
| Total C2 (% in weight) | 4.0 | 4.6 |
| [A] (%) | 91.7 | 91.1 |
| II | 0.98 | 0.98 |
| [B] (%) | 8.3 | 8.9 |
| C2 (B) (% in weight) | 48.2 | 51.7 |
| β/α | 1.8 | 1.3 |
| MFI (g/10 minutes) | 0.51 | 0.30 |
| Charpy at 23° C. (kJ/m2) | 80.4 | 77.6 |
| Charpy at 20° C. (kJ/m2) | 4.1 | 4.0 |
| Flex. Mod. (MPa) | 1,741 | 1,679 |
| XS (A) (%) | 1.6 | 1.6 |
| XS material (%) | 8.7 | 9.2 |
| XS (B) (%) | 85 | 85 |

What is claimed is:

1. Tubes formed from a propylene polymer based composition having a flexural modulus of 1,400 to 2,000 MPa and a melt flow index of 0.1 to 1 g/10 minutes, including: from 80 to 97 parts in weight of a propylene homopolymer (A) having an isotacticity index of at least 0.96, and from 20 to 3 parts in weight of a statistical copolymer of propylene (B) containing from 45% to 70% ethylene by mole and/or alpha olefin containing from 4 to 8 atoms of carbon, the ratio of the intrinsic of polymer (B) to polymer (A) being at least 1.55 and less than or equal to 3.

2. Tubes formed from a propylene polymer based composition having a flexural modulus of 1,500 to 1,900 MPa, a melt flow index of 0.3 to 0.6 g/10 minutes, and including: from 85 to 95 parts in weight of a propylene homopolymer (A) having an isotacticity index of at least 0.96, and from 15 to 5 parts in weight of a statistical copolymer of propylene (B) having from 35% to 55% in weight of ethylene, the ratio of the intrinsic viscosity of polymer (B) to polymer (A) being 1.6 to 2.

3. Tubes formed from a propylene polymer based composition of claim 1, in which the melt flow index is 0.3 to 0.6.

4. Tubes formed from a propylene polymer based composition of claim 1, in which polymers A and B are prepared in successive stages of polymerization.

5. Tubes formed from a propylene polymer based composition of claim 2, in which polymers A and B are prepared in successive stages of polymerization.

6. Tubes formed from a propylene polymer based composition of claim 4, in which at least one polymerization is in the gas phase.

7. Tubes formed from a propylene polymer based composition of claim 5, in which at least one polymerization is in the gas phase.

8. Tubes formed from a propylene polymer based composition of claim 1, which contains up to 10 weight percent additives.

9. Tubes formed from a propylene polymer based composition of claim 2, which contains up to 10 weight percent additives.

10. Tubes according to any one of claims 1, 2 or 3–9 designed to transport low pressure fluids.

* * * * *